(12) United States Patent
Hara

(10) Patent No.: US 8,228,564 B2
(45) Date of Patent: Jul. 24, 2012

(54) APPARATUS, SYSTEM, AND METHOD FOR IDENTIFYING EMBEDDED INFORMATION

(75) Inventor: Takayuki Hara, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 351 days.

(21) Appl. No.: 12/379,010

(22) Filed: Feb. 11, 2009

(65) Prior Publication Data

US 2009/0201556 A1  Aug. 13, 2009

(30) Foreign Application Priority Data

Feb. 11, 2008  (JP) ................ 2008-029834

(51) Int. Cl.
*H04N 1/40* (2006.01)
*G06K 9/00* (2006.01)

(52) U.S. Cl. ............... 358/3.28; 382/100

(58) Field of Classification Search ............ 358/3.28; 382/100
See application file for complete search history.

(56) References Cited

U.S. PATENT DOCUMENTS

| 6,757,430 | B2 * | 6/2004 | Metz et al. ............ 382/173 |
|---|---|---|---|
| 7,668,336 | B2 | 2/2010 | Ishii |
| 2003/0179412 | A1 * | 9/2003 | Matsunoshita ........ 358/3.28 |
| 2004/0022411 | A1 * | 2/2004 | Tamaru et al. ......... 382/100 |
| 2004/0042636 | A1 * | 3/2004 | Oh ........................ 382/100 |
| 2006/0193525 | A1 | 8/2006 | Ishii |
| 2006/0198549 | A1 | 9/2006 | Van Vugt et al. |
| 2006/0238824 | A1 * | 10/2006 | Otake et al. ........... 358/448 |
| 2007/0047758 | A1 * | 3/2007 | Pullen et al. .......... 382/100 |
| 2007/0110273 | A1 | 5/2007 | Hara |

FOREIGN PATENT DOCUMENTS

| CN | 1771513 | 5/2006 |
|---|---|---|
| CN | 1825892 | 8/2006 |
| EP | 0 840 513 | 5/1998 |
| EP | 1 667 422 | 6/2006 |
| JP | 2006-238119 | 9/2006 |

OTHER PUBLICATIONS

Xiamu Niu et al., "Video Watermarking Resisting to Rotation, Scaling, and Translation", *Proc. SPIE*, vol. 4675 pp. 512-519 (2002).
European Search Report dated Apr. 21, 2009 for corresponding European Application No. 09250332.5.
Chinese Office Action dated Jul. 14, 2010 for corresponding Chinese Application No. 200910007512.X.
European Office Action dated Jan. 17, 2011 for corresponding European Application No. 09250332.5.
Seong-Goo Jeon et al., "Digital watermarking method using a two-dimensional barcode", *Proc. Of SPIE*, vol. 6041, pp. 60412L-1-7, (2005).

* cited by examiner

*Primary Examiner* — Twyler Haskins
*Assistant Examiner* — Barbara Reinier
(74) *Attorney, Agent, or Firm* — Harness, Dickey & Pierce, P.L.C.

(57) ABSTRACT

An information identification apparatus includes a processor and a storage device. The storage device stores computer programmed instructions which when activated by the processor cause the processor to operate as a specially programmed processor. The processor obtains image data assumed to be embedded with supplemental information, extracts a portion of the image data to obtain target pattern data from the portion of the image data, obtains reference information, compares the target pattern data with the reference information to generate a comparison result, and determines whether the supplemental information embedded in the image data is identifiable using the reference information based on the comparison result.

17 Claims, 9 Drawing Sheets

FIG. 12A
RELATED ART
EMBEDDED SUPPLEMENTAL INFORMATION: 1 0 1 1 0 1
ADDED PATTERNS: 1 0 1 1 0 1   1 0 1 1 0 1   1 0 1 1 0 1
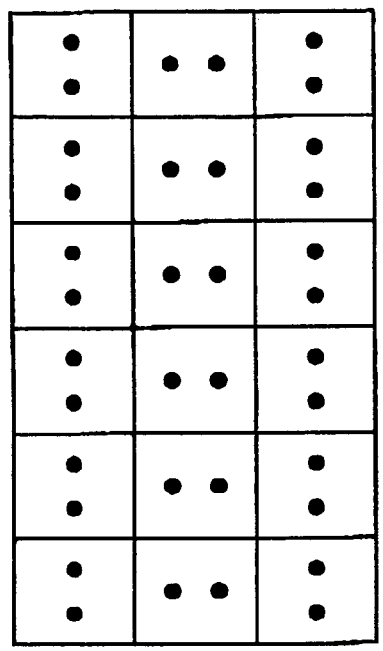
ACQUISITION → 1 0 1 1 0 1
1 0 1 1 0 1
1 0 1 1 0 1
ANALYSIS ⇩
SUPPLEMENTAL INFORMATION: 1 0 1 1 0 1
FIG. 12B
RELATED ART
INFORMATION BIT    0         1
                   ↓         ↓
DOT PATTERN   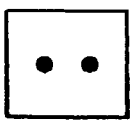   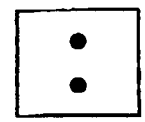

APPARATUS, SYSTEM, AND METHOD FOR IDENTIFYING EMBEDDED INFORMATION

CROSS-REFERENCE TO RELATED APPLICATIONS

The present patent application claims priority pursuant to 35 U.S.C. §119 from Japanese Patent Application No. 2008-029834, filed on Feb. 11, 2008 in the Japan Patent Office, the entire contents of which are hereby incorporated herein by reference.

BACKGROUND OF THE INVENTION

1. Field of the Invention

Example embodiments of the present invention relate to an apparatus, system, method, and recording medium, each capable of identifying information embedded in image data or a printed document.

2. Description of the Background

Recently, to enhance the security or added-value of image data, supplemental information may be embedded in the image data using electronic watermark or dot pattern technology. Such supplemental information embedded in the image data may include, for example, copyright, security, or confidential information associated with the image data.

To precisely identify supplemental information embedded in image data, one background technology repeatedly adds a pattern corresponding to the supplemental information to the image data.

For example, as illustrated in FIG. 12A, when a bit string of "101101" is embedded in image data as supplemental information, a sequence of dot patterns representing "101101" may be repeatedly added to the image data as supplemental information so that the supplemental information can be precisely identified even if a portion of the repeated patterns cannot be properly extracted due to image noise or other factors. In this example illustrated in FIG. 12A, the information bits 0 and 1 are respectively embedded as dot patterns illustrated in FIG. 12B.

In the process of identifying such supplemental information, the above-described background technology acquires pattern data while the image data is being scanned, and converts the acquired pattern data to the supplemental information by a predetermined method. Accordingly, when the same pattern is repeatedly added to the image data, the processing speed may decrease. For example, as illustrated in FIG. 12A, when the dot-pattern sequence corresponding to "101101" is repeatedly added to the image data, the above-described background technology acquires all patterns readable from the scanned area, analyzes the acquired patterns to obtain one pattern specifying the supplemental information, and converts the obtained pattern to the supplemental information, thus resulting in a reduced processing efficiency.

SUMMARY OF THE INVENTION

The present disclosure provides an apparatus, system, and method each capable of identifying supplemental information embedded in image data or a printed document.

In one illustrative embodiment, an information identification apparatus includes a processor and a storage device. The storage device stores computer programmed instructions which when activated by the processor cause the processor to operate as a specially programmed processor. The processor obtains image data assumed to be embedded with supplemental information, extracts a portion of the image data to obtain target pattern data from the portion of the image data, obtains reference information, compares the target pattern data with the reference information to generate a comparison result, and determines whether the supplemental information embedded in the image data is identifiable using the reference information based on the comparison result.

In another illustrative embodiment, a system for identifying supplemental data includes an information identification apparatus with a processor and a storage device. The storage device stores computer programmed instructions which when activated by the processor cause the processor to operate as a specially programmed processor. The processor obtains image data assumed to be embedded with supplemental information, extracts a portion of the image data to obtain target pattern data from the portion of the image data, obtains reference information, compares the target pattern data with the reference information to generate a comparison result, and determines whether the supplemental information embedded in the image data is identifiable using the reference information based on the comparison result.

In still another illustrative embodiment, a method of identifying supplemental information assumed to be embedded in image data includes obtaining image data assumed to be embedded with supplemental information, extracting a portion of the image data to obtain target pattern data from the portion of the image data, obtaining reference information, comparing the target pattern data with the reference information to generate a comparison result, and determining whether the supplemental information embedded in the image data is identifiable using the reference information based on the comparison result.

BRIEF DESCRIPTION OF THE DRAWINGS

A more complete appreciation of the disclosure and many of the attendant advantages thereof will be readily acquired as the same becomes better understood by reference to the following detailed description when considered in connection with the accompanying drawings, wherein:

FIG. 12A is an illustration for explaining operation of extracting supplemental information from image data according to a background art; and FIG. 12B is an illustration for explaining conversion from information bits to dot patterns.

Figure 1:
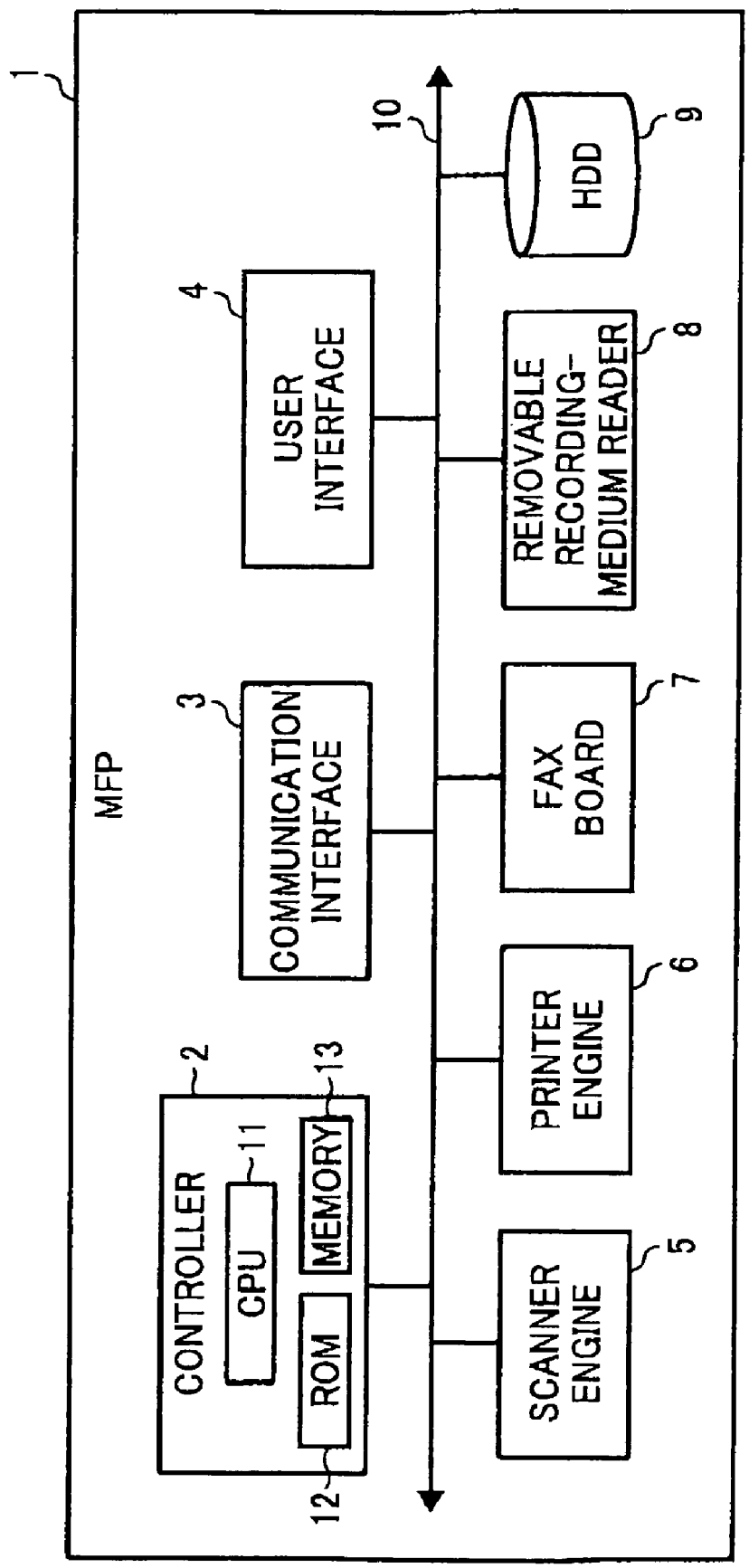
FIG. 1 is a block diagram illustrating a hardware configuration of an MFP (multi functional peripheral) according to an illustrative embodiment of the present disclosure.

The accompanying drawings are intended to depict illustrative embodiments of the present disclosure and should not be interpreted to limit the scope thereof. The accompanying drawings are not to be considered as drawn to scale unless explicitly noted.

DETAILED DESCRIPTION OF ILLUSTRATIVE EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the illustrative embodiments are described with technical limitations with reference to the attached drawings, such description is not intended to limit the scope of the present invention and all of the components or elements described in the illustrative embodiments of this disclosure are not necessarily indispensable to the present invention.

FIGS. 1 to 6 illustrate an information identification apparatus, information identification method, recording medium according to an illustrative embodiment of the present disclosure. FIG. 1 is a block diagram illustrating a configuration of an MFP (multi functional peripheral) 1 according to the present illustrative embodiment, which has capabilities of a copier, facsimile machine, scanner, and printer.

In FIG. 1, the MFP 1 includes a controller 2, a communication interface 3, a user interface 4, a scanner engine 5, a printer engine 6, a fax (facsimile) board 7, a removable recording-medium reader 8, and an HDD (hard disk drive) 9. Such components are electrically connected through a bus line 10. The bus line 10 may be, for example, an address bus or a data bus.

The controller 2 includes a CPU (central processing unit) 11, a ROM (read only memory) 12, a memory (main memory) 13 such as a RAM (random access memory). The ROM 12 stores programs and other data to be used by the CPU 11. The CPU 11, while using the memory 12 as a work memory, controls the components of the MFP 1 in accordance with a program, which may be previously stored on the ROM 12, the HDD 9, or any other storage device accessible by the CPU 11. Specifically, in this example, the CPU 11 executes an information identification method described later according to an information processing program, which may be stored in any desired storage device.

The MFP 1 is configured as an information identification apparatus capable of identifying supplemental information embedded in image data such as still image data or moving image data, or a printed document, by loading the information processing program onto the memory 13. Specifically, such supplemental information may be embedded in one or more frame images of moving image data or one or more pages of a printed document. The information processing program causes the MFP 1 or any other apparatus to operate as an information identification apparatus that performs an information identification method according to the present illustrative embodiment. The program, comprising program modules, may be recorded on a recording medium that the information identification apparatus can read. The recording medium may be, for example, a ROM, an EEPROM (electrically erasable and programmable read only memory), an EPROM (erasable and programmable read only memory), a flash memory, a flexible disk, a CD-ROM (compact disc read only memory), a CD-RW (compact disc rewritable), a DVD (digital video disc), an SD (secure digital) card, or an MO (magneto-optical) disc. The program may be a computer-executable program written in legacy or object-oriented programming language, such as assembler, C, C++, C#, or Java (registered trademark), which may be stored on one of the above-described recording media for distribution. Alternatively, the MFP 1 may read the information processing program from any device through a network.

Under the control of the controller 2, the communication interface 3 communicates with an external device directly or indirectly connected to the MFP 1. The communication interface 3 may be an Ethernet (registered trademark) interface, IEEE 1284 interface, or any other suitable interface.

The user interface 4 includes one or more input and output devices. For example, the input device may include a pointing device, such as a mouse or touch pen, or a keyboard. The output device may include a display, such as an LCD (liquid crystal display) or CRT (cathode ray tube), and a sound interface. Alternatively, the input device and the output device may be integrated into one device such as a touch panel. Through such devices, the user interface 4 receives input operations via a plurality of operation keys from a user and displays various types of information on the display. Thus, the user interface 4 outputs (provides) information to and inputs instructions (information) from a user.

Under the control of the controller 2, the scanner engine 5 scans an original document at any desired resolution in both main- and sub-scan directions to obtain image data.

Under the control of the controller 2, the printer engine 6 outputs an image onto a recording sheet, which is generated based on the image data of a print target using, for example, a certain print method such as an electrophotographic or inkjet print method. The print engine 6 may include components to output image data onto a recording sheet by an electrophotographic print method using a laser beam. Such components may be, for example, a photoconductor, an optical writing device, a developing device, a charge device, and a cleaning device. The printer engine 6 activates the optical writing device with image data and control signals to form an electrostatic latent image on the photoconductor, and supplies toner from the developing device onto the photoconductor to form a toner image. Meanwhile, the printer engine 6 feeds a recording sheet from a sheet feeder and transports the recording sheet through a sheet transport path to a nip formed between the photoconductor and a transfer device. When the toner image is transferred onto the recording sheet, the recording sheet having the toner image is transported into a fixing device. The printer engine 6 fixes the toner image on the recording sheet with heat and pressure in the fixing device, thus outputting the desired image onto the recording medium.

The fax board 7 is connected to a communication network such as a public network (PN). Under the control of the controller 2, the fax board 7 transmits and receives facsimile data.

Under the control of the controller 2, the removable recording-medium reader 8 reads information recorded on a removable recording medium, such as an IC (integrated circuit) card or a flexible disk, and reports loading of the information to the controller 2. It is to be noted that such a removable recording medium read by the removable recording-medium reader 8 is not limited to the above-described recording medium but may be a SD card, a compact flash (registered trademark) memory card, a smart media (registered trademark), a memory stick (registered trademark), a picture card, any other memory-type recording medium, any other removable recording medium, or any combination of several of the foregoing media.

The HDD 9 is a storage device to store image data, document data, programs, font data, and other data. Such data are read from or written to the HDD 9 by the controller 2.

The MFP 1 operates as, for example, a printer to print data from an external device via the communication interface 3 onto a recording sheet using the printer engine 6, a scanner to read an image from an original document using the scanner engine 5, and a facsimile machine to receive a facsimile image from a sender via the fax board 7, print the facsimile image using the printer engine 6, or send an image read from an original document to a sender via the fax board 7. Alternatively, the MFP 1 may communicate with the other apparatus via a network through the communication interface 3.

Figure 2:
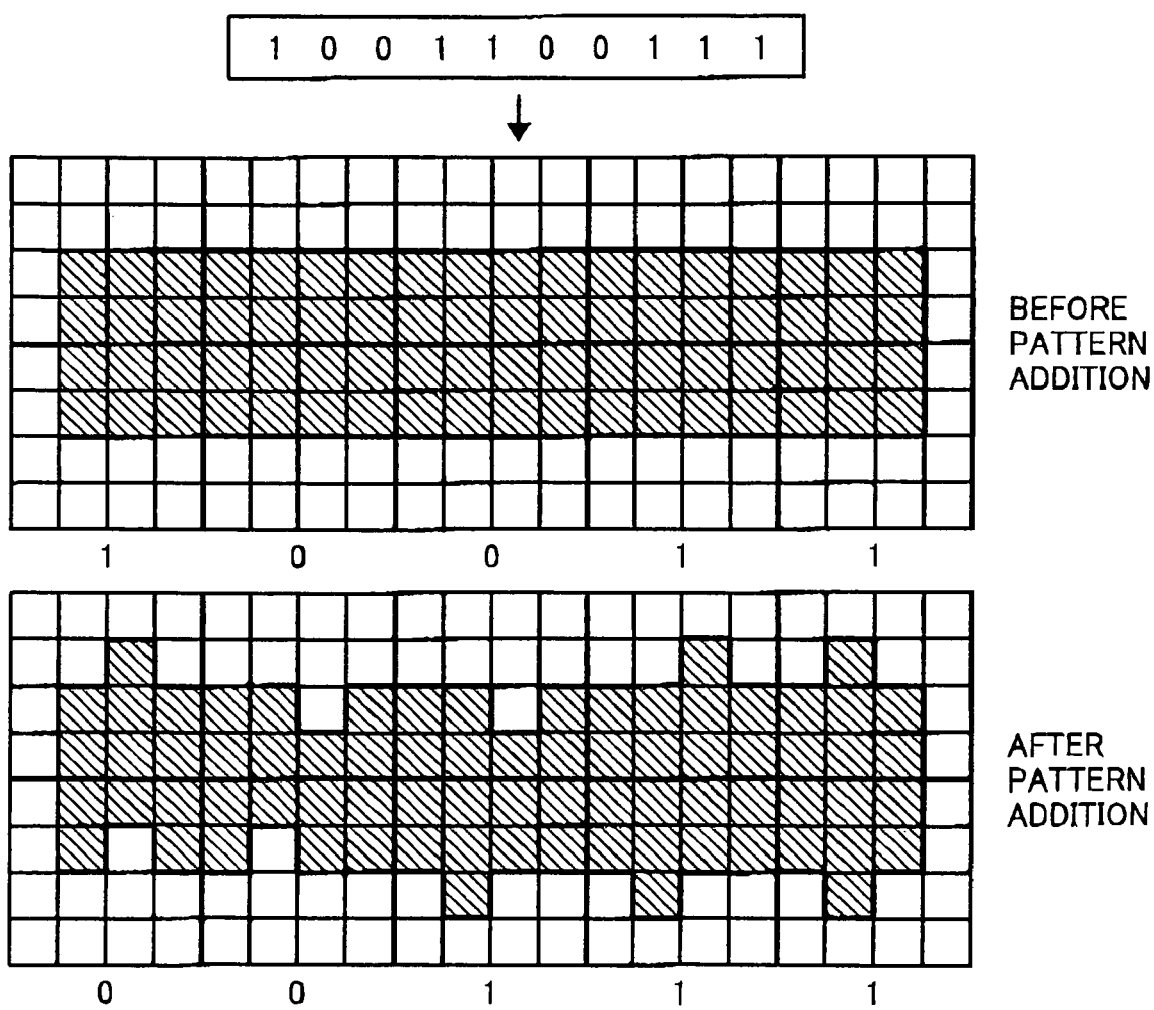
FIG. 2 is an illustration for explaining operation of adding supplemental information to image data.

By executing the information processing program stored on the above-described recording medium, the MFP 1 identifies supplemental information using image data in which the supplemental information is embedded as illustrated in FIG. 2. Such supplemental information embedded in image data may include, for example, copyright-management information or security information.

Such supplemental information embedded in image data is converted to a bit string (digital data), for example, "1001100111" as illustrated in FIG. 2. The bit string is transformed to pattern data corresponding to bit values constituting the bit string (digital data). Thus, the pattern data corresponding to the bit string is generated.

As illustrated in the states before and after pattern addition of FIG. 2, the generated pattern data is added to the image data, so that the supplemental information is embedded into the image data. In FIG. 2, the pattern data corresponding to the supplemental information is added to the image data using dot patterns. However, it is to be noted that the pattern data corresponding to the related information may be added to image data using, for example, bar codes, frequency transformation of the image data, or deformation of the outline of an image component, such as a figure or character, contained in the image data, or bit information (bit values or bit strings) corresponding to such a pattern.

Further, the patterning may be redundant. In other words, such a pattern corresponding to the supplemental information may be repeatedly added multiple times to image data. In such a case, even if a portion of the repeated pattern data added to the image data is lost due to image noise or other factors, other portions of the repeated pattern data allow the supplemental information to be precisely acquired. For example, when a bit string (digital data) of "1011" corresponding to supplemental information is repeatedly embedded twice in image data, a plurality of sets of dot patterns corresponding to the bit string of "10111011" is added to the image data.

Figure 3:
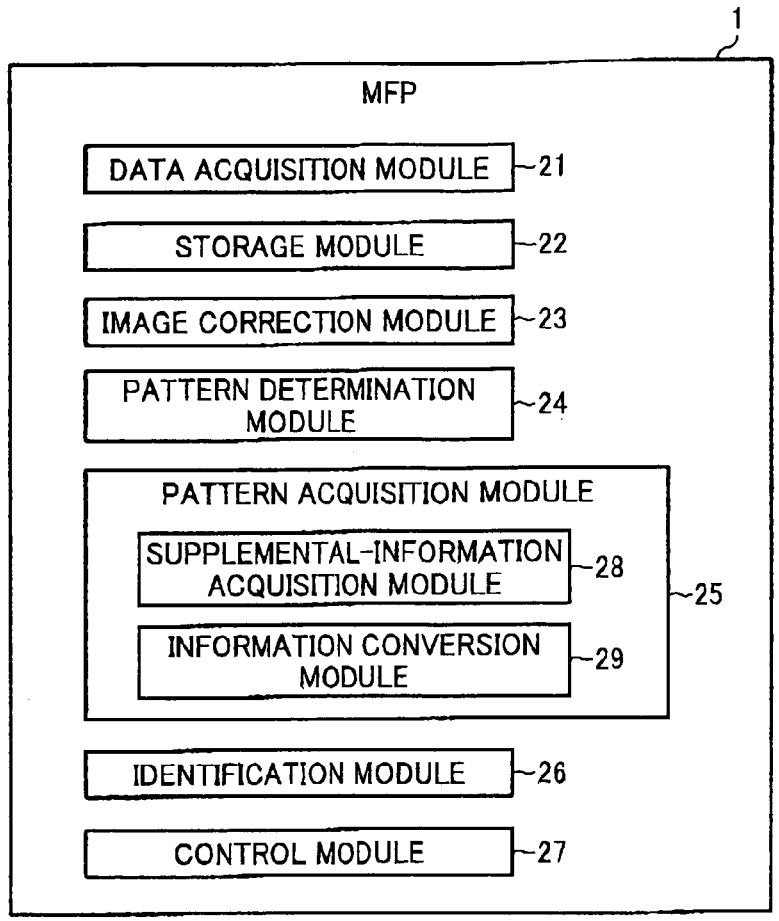
FIG. 3 is a block diagram illustrating a functional configuration of the MFP illustrated in FIG. 1.
Figure 4:
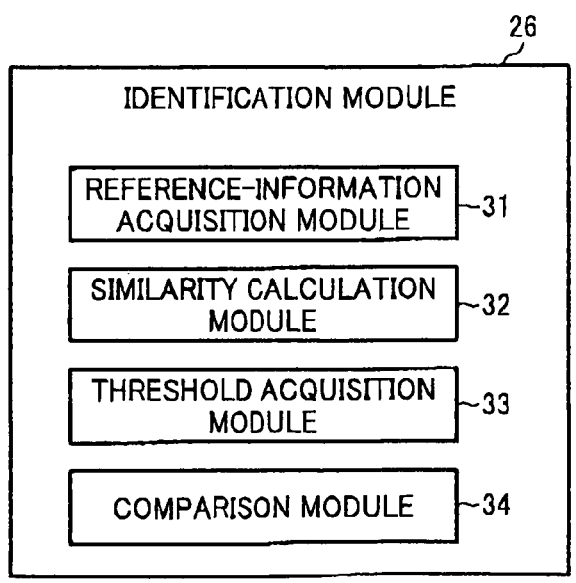
FIG. 4 is a block diagram illustrating a functional configuration of an identification module illustrated in FIG. 3.

The MFP 1 loads the information processing program comprising program modules for executing the above-described information identification method from a recording medium onto the memory 13, thereby constructing a plurality of modules as illustrated in FIG. 3. By executing the program, the MFP 1 constructs, for example, a data acquisition module 21, a storage 22, an image correction module 23, a pattern determination module 24, a pattern acquisition module 25, an identification module 26, and a control module 27. The pattern acquisition module 25 further includes an information acquisition module 28 and an information conversion module 29. As illustrated in FIG. 4, the identification module 26 may further include a reference-information acquisition module 31, a similarity calculation module 32, a threshold acquisition module 33, and a comparison module 34.

The data acquisition module 21 acquires image data in which supplemental information is embedded, and stores the acquired image data to the storage 22 at least for temporarily. For example, the data acquisition module 21 may be implemented by the communication interface 3 which receives image data as electronic data from an external device, or the scanner engine 5 which acquires image data by scanning a sheet of recording media such as an original document.

The image correction module 23 reads image data stored in the storage 22 to correct the image data. For example, an unstable factor, such as noise, distortion, or skew, might appear in the image data scanned by the scanner engine 5, thereby preventing the supplemental information embedded in the image data from being precisely extracted. Hence, the image correction module 23 performs image correction, such as noise removal or distortion correction, on the image data. In another example, the image correction module 23 may obtain the image data acquired by the data acquisition module 21 directly from the data acquisition module 21 for correction rather than reading from the storage 22.

The pattern determination module 24 determines which pattern is to be acquired from among a plurality of patterns added to the image data, and passes the determination result to the pattern acquisition module 25.

The method of determining such target pattern data with the pattern determination module 24 may include, for example, a region extraction method, in which one or more candidate regions are extracted to acquire a target pattern and a pattern matching extraction method, in which one or more candidate patterns are extracted to acquire target pattern data. Below, the two methods are described in turn, although it is to be noted that the method of determining target pattern data is not limited to the two methods but may be any other suitable method.

First, a description is given of the region extraction method, in which one or more candidate regions are extracted from image data to acquire target pattern data.

In the region extraction method, image data is divided into a plurality of regions to extract one or more candidate regions. The image data may be divided into a plurality of regions each having a predetermined size, divided into a plurality of regions based on different attributes, such as a region having character data and a region having picture data such as photographic data, or scanned to select a pixel that meets a predetermined condition as a selected pixel. Once the selected pixel is obtained, image data is divided into a plurality of regions each region having a plurality of pixels located around the selected pixel. For example, the selected pixel may be a pixel having a pixel density equal to or greater than a first predetermined threshold value, with the pixel density value being different from a density value of a neighboring pixel by at least a second predetermined threshold value.

In the pattern matching extraction method, in which one or more candidate patterns are extracted from image data to acquire target image data, master pattern data having a predefined pattern shape is compared, one by one, to a portion of image data. Based on the comparison, one or more candidate patterns are obtained to determine the target pattern data that is assumed to be embedded in the image data. Such comparison is sequentially performed in accordance with a scan order of the image data, thereby allowing such candidate patterns to be securely extracted. Such master pattern data may be input via the communication interface 3 or the removable recording-medium reader 8, or from the ROM 12 of the controller 2 or the HDD 9.

Once the candidate patterns are extracted, the pattern determination module 24 selects one or more of the patterns extracted using the above-described region extraction method or pattern matching extraction method, and determines the selected pattern to be used as target pattern data. For example, such target pattern data may be determined by random sampling, in which one or more patterns are randomly selected from the extracted patterns. Specifically, random numbers may be generated for the respective extracted patterns using a random number generator to determine such target pattern data. In such a case, for example, the pattern determination module 24 may determine to acquire only extracted patterns having odd numbers. Alternatively, the pattern determination module 24 may determine a pattern located at a predetermined position as the target pattern data.

As described above, the pattern acquisition module 25 includes the supplemental-information acquisition module 28 and the information conversion module 29 to acquire patterns added to the image data.

The supplemental-information acquisition module 28 acquires target pattern data from the image data that matches the target pattern data determined by the pattern determination module 24. The method of acquiring the target pattern data differs depending on the method in which the supplemental information is embedded in the image data, such as the dot-pattern embedment method, the outline-shape modification embedment method, or the frequency-component modification embedment method. The pattern acquisition module 28 may acquire information specifying which type of pattern has been added to the image data from among a plurality of types of patterns. Further, when the supplemental information is embedded using the above-described dot-pattern embedment method or outline-shape modification embedment method, a detection filter may be used to detect patterns added to the image data as the supplemental information.

The information conversion module 29 converts the target pattern data acquired by the supplemental-information acquisition module 28 to a bit string represented by the pattern added to the image data, and passes the bit string to the identification module 26.

As illustrated in FIG. 4, the identification module 26 includes the reference-information acquisition module 31, the similarity calculation module 32, the threshold acquisition module 33, and the comparison acquisition module 34, and identifies whether or not the supplemental information is embedded in the image data based on a matching rate, or degree of similarity, between the target pattern data acquired by the pattern acquisition module 25 and the reference information.

The reference-information acquisition module 31 acquires the reference information, which is used to identify the supplemental information added to the image data. The reference-information acquisition module 31 may acquire the reference information from an external device via the communication interface 3 or from a removable recording medium via the removable recording-medium reader 8. Further, the reference-information acquisition module 31 may acquire the reference information stored on the ROM 12 of the controller 2 or the HDD 9.

The similarity calculation module 32 calculates the matching rate (degree of similarity) between the reference information acquired by the reference-information acquisition module 31 and the pattern data acquired by the pattern acquisition module 25, and passes the degree of calculated similarity to the comparison module 34. In the similarity calculation, when the number of bits of the reference information is identical to the number of bits of the acquired pattern data, the degree of similarity can be more precisely calculated. Accordingly, the number of bits of the pattern data acquired by the pattern determination module 24 may be determined after the reference information is acquired by the reference-information acquisition module 31.

The threshold acquisition module 33 acquires a threshold stored in the storage 22, and passes the threshold to the comparison module 34. It is to be noted that the threshold acquisition module 33 may acquire such a threshold via, for example, the data acquisition module 21.

The comparison module 34 compares the degree of similarity calculated by the similarity calculation module 32 to the threshold acquired by the threshold acquisition module 33. If the degree of similarity is greater than the threshold, the comparison module 34 determines that the reference information and the pattern data are identical or similar, or contain the substantially the same information. By contrast, if the similarity value is not greater than the threshold, the comparison module 34 determines that the reference information and the pattern data are dissimilar or contain information different from each other.

Further, as illustrated in FIG. 3, the control module 27 controls operations of the data acquisition module 21, the storage 22, the image correction module 23, the pattern determination module 24, the pattern acquisition module 25, and the identification module 26.

Next, a description is given of an information identification process according to the present illustrative embodiment.

Figure 5:
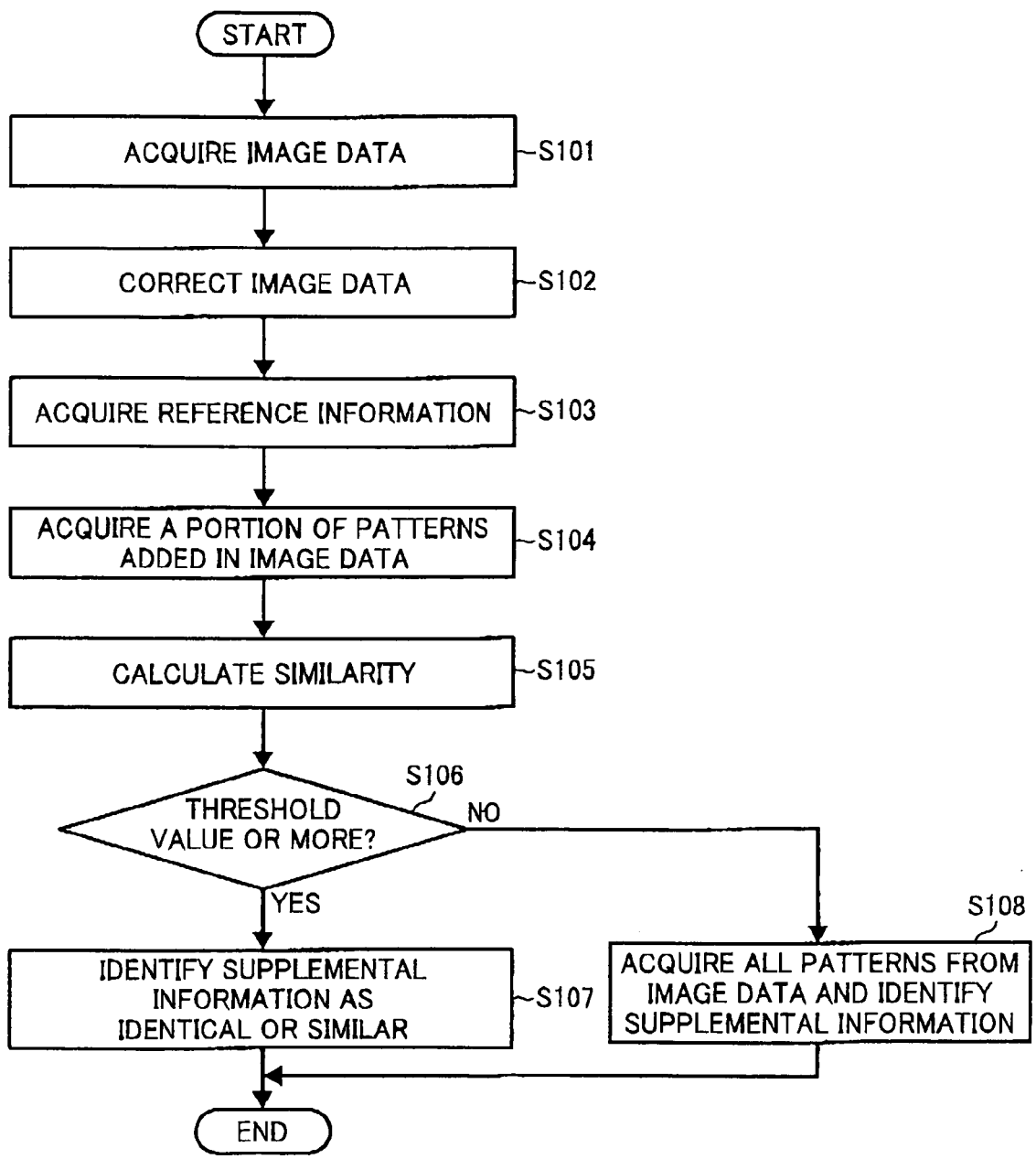
FIG. 5 is a flowchart illustrating an information identification process executed by the MFP illustrated in FIG. 1.

As illustrated in FIG. 5, according to the present illustrative embodiment, the MFP 1 selects one or more patterns from the plurality of patterns added in image data as the target pattern data, which is to be acquired from the image data, and acquires target pattern data that matches the determined target pattern data from the image data. This may reduce the processing time for the pattern extraction, since extracting all the patterns form the image data is not required. Further, converting the extracted target pattern data is not required to obtain the supplemental information embedded in the image data, thus further reducing the processing time.

Specifically, in FIG. 5, at S101 the MFP 1 acquires image data in which supplemental information is assumed to be embedded, and stores the image data into the storage 22 constructed by the HDD 9 or the memory 13. At S102, the image correction module 23 acquires the image data stored in the storage 22, and performs image correction, such as noise removal or distortion correction, on the image data. As described above, the image correction module 23 may perform the image correction on the image data before the image data acquired by the data acquisition module 21 is stored in the storage 22.

At S103, the reference-information acquisition module 31 acquires reference information that is used to identify the supplemental information that is assumed to be added to the image data. The supplemental-information acquisition module 28 reads the image data from the storage 22, and acquires the target pattern data that matches the target pattern data determined by the pattern determination module 24 from the plurality of patterns added to the target image data.

At S105, the similarity calculation module 32 of the identification module 26 calculates a degree of similarity between the reference information and the target pattern data. At S106, the comparison module 34 of the identification module 26 compares the calculated degree of similarity to the threshold acquired by the threshold acquisition module 33 of the identification module 26.

The similarity calculation module 32 calculates the degree of similarity between the reference information and the target pattern data. Below, for the sake of simplicity, an example in which the number of bits of the reference information is identical to the number of bits of the target pattern data is described with reference to FIG. 6. Further, in FIG. 6, either of the reference information and the target pattern data consists of 8 bits.

Figure 6:
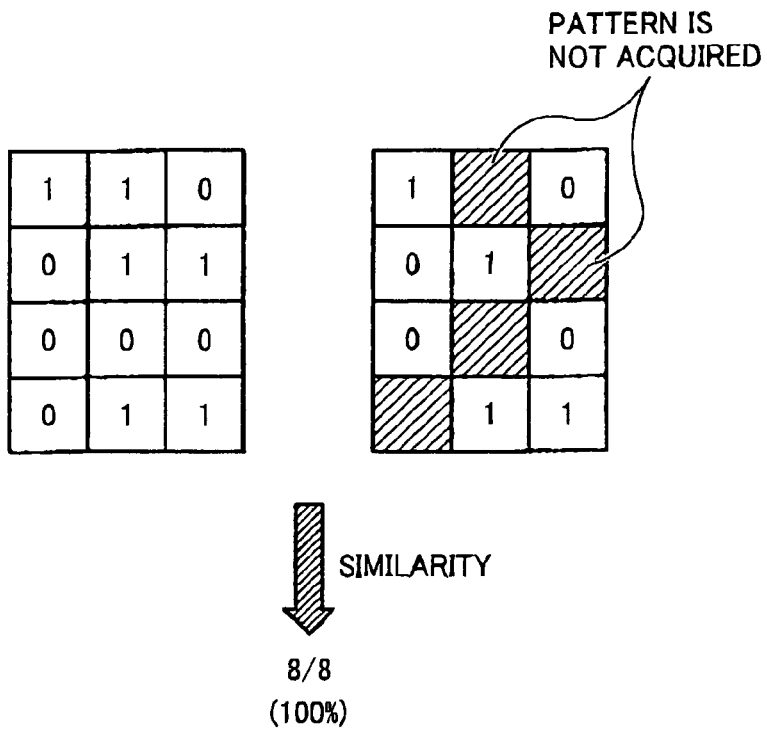
FIG. 6 is an illustration for explaining an example of similarity calculation executed by a similarity calculation module during identification processing.

In FIG. 6, the acquired bit values are identical between the reference information and the acquired pattern. That is, each of the 8 bits of the acquired pattern data is identical to the corresponding bit of the 8 bits of the reference pattern, resulting in 100% in matching rate and similarity. In this regard, the similarity calculation module 32 may estimate a degree of similarity using any desired likelihood function, instead of calculating a matching rate.

For example, such a likelihood function "L" may be expressed as below:

$$L = P^n (1-P)^m$$

where "P" represents a probability with which supplemental information can be properly extracted from an area, "n" represents the number of pairs in which bit values match between the reference information and the target pattern data, and "m" represents the number of pairs in which bit values are different between the reference information and the target pattern data.

In the similarity calculation, when the reliability of the extracted information can be expressed using multi-value data, the multi-value data may be used as the degree of similarity. For example, in one calculation method, the reliability is calculated for each bit of the acquired pattern data, and the degree of similarity is determined based on the sum of the reliabilities being obtained respectively for bits that matches the reference information.

In another example, the degree of similarity may be calculated based on a probability model for reliability. For example, where "α" represents the reliability of a bit in acquired pattern data, "P(α)" represents a matched probability of bits between the reference information and the extracted information, "LC" represents a value obtained by multiplying all of the P(α) values of matched bits, and "LE" represents a value obtained by multiplying all of the 1-P(α) values of unmatched bits, the degree of similarity is obtained by multiplying the LC and LE.

If at S106 the comparison module 34 determines that the degree of similarity is greater than a threshold, at S107 the identification module 26 determines that the reference information and the acquired pattern data are identical, similar, or contain of the substantially similar information, and the control module 27 controls the subsequent process steps based on the determination result.

By contrast, if at S106 the comparison module 34 determines that the degree of similarity is not greater than the threshold, at S108 the identification module 26 determines that the reference information and the acquired pattern data are dissimilar information or contain information that are different from each other. Further, the comparison module 34 determines that the supplemental information embedded in the image data and the reference information are dissimilar or contain information that are different from each other, all of the patterns added to the image data are extracted, and the supplemental information embedded in the image data is identified based on all of the extracted patterns. The processing at S108 is executed in the same manner as the processing executed when the pattern determination module 24 determines all of the patterns added to the image data as the target pattern data.

As described above, the MFP 1 according to the present illustrative embodiment employs the pattern determination module 24 to select one or more patterns from the plurality of patterns added to the image data as target pattern data to be acquired from the image data. The pattern acquisition module 25 acquires pattern data that matches the target pattern data from the image data, and the identification module 26 identifies the supplemental information from the acquired pattern data.

Thus, without extracting all patterns or converting the extracted pattern data to the supplemental information, the MFP 1 can identify the supplemental information embedded in the image data, with increased efficiency and increased processing speed.

According to the present illustrative embodiment, the MFP 1 also employs the reference-information acquisition module 31 to acquire the reference information, which is used to identify the supplemental information, and the identification module 26 identifies the supplemental information based on the pattern data acquired from the image data and the reference information.

Thus, without requiring conversion from the acquired pattern data to the supplemental information, the MFP 1 can more identify the supplemental information embedded in the image data with increased accuracy and improved efficiency.

Further, the MFP 1 may employ the reference-information acquisition module 31 to acquire information embedded in the image data as the reference information, thus allowing the supplemental information to be identified without requiring other image data to be used for obtaining the reference information.

The MFP 1 employs the identification module 26 to identify the supplemental information based on the degree of similarity between the pattern data acquired from the image data and the reference information, thus allowing the supplemental information to be more effectively and properly identified using the image data.

The MFP 1 also employs the identification module 26 to determine whether or not the supplemental information and the reference information contain the substantially similar information based on the degree of similarity. If the identification module 26 determines that they are do no contain the same or substantially similar information, the pattern acquisition module 25 acquires all of the patterns added to the image data, and the identification module 26 identifies the supplemental information based on all of the acquired patterns.

Thus, the manner in which the supplemental information embedded in the image data is identified is varied depending on the similarity result. This may increase the processing speed when the similarity result indicates that the extracted information and the reference information are substantially similar, as extraction of all patterns or conversion from the extracted information to supplemental information is not required. When the similarity result indicates that the extracted information and the reference information are different from each other, all patterns are extracted from the image data, which is to be used to identify the supplemental information embedded in the form of the patterns previously added to the image data. Thus, the processing speed increases while increasing the reliability.

The above-described method of identifying supplemental information may be implemented, especially, when first image data and second image data are assumed to be substantially similar. For example, the first image data and the second image data may be obtained from one document. In such case, the first data corresponding to one page document and the second data that corresponds to one page document are likely to be embedded with identical or similar supplemental information. For example, information relating the document such as the document title, author, or document identification number may be embedded as supplemental information into both the first image data and the second image data. In another example, the first image data and the second image data may be obtained from one moving data. In such case, the first data that corresponds to a first flame and the second data that corresponds to a second flame are likely to be embedded with identical or the same type of supplemental information such as information regarding the copy right.

In such case, once the supplemental information embedded in first image data is identified, the supplemental information of the first image data may be stored on the HDD 9 or a removable recording medium. In such a case, the MFP 1 may extract pattern data from the second image data, which is assumed to have the supplemental information that is similar to the supplemental information of the first image data that has been identified before. The MFP 1 determines whether or not identical or the same type of supplemental information is embedded in the second image data without requiring extraction of all pattern data or conversion from the extracted information to the supplemental information.

Such configuration allows the supplemental information to be more precisely and effectively identified using the image data.

Next, a description is given of an information identification apparatus, information identification method, and recording medium according to another illustrative embodiment of the present disclosure.

Figure 7:
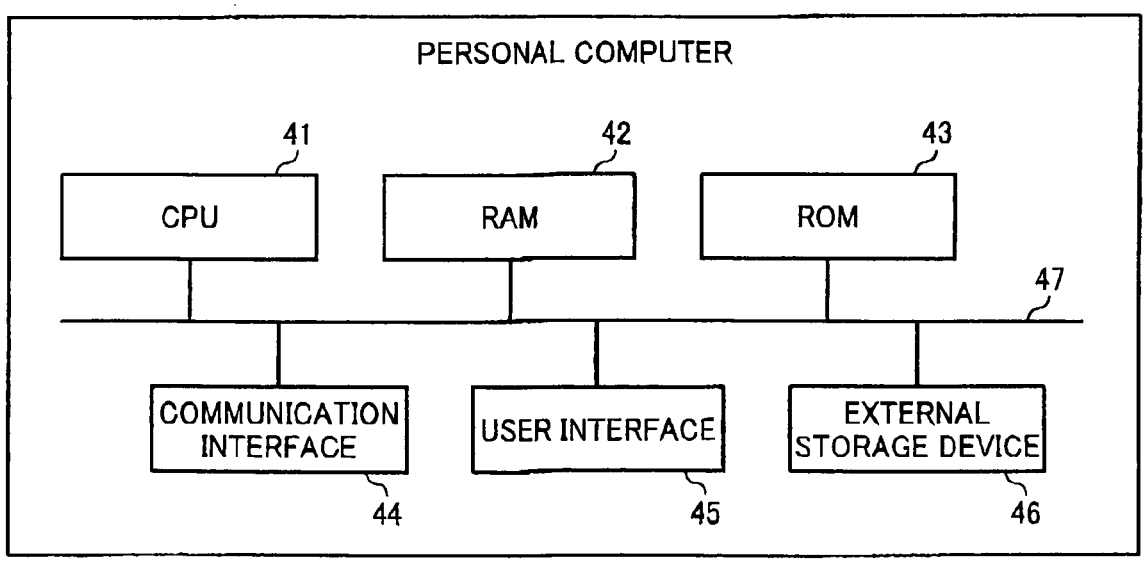
FIG. 7 is a block diagram illustrating a hardware configuration of a personal computer according to another illustrative embodiment of the present disclosure.

FIG. 7 is a block diagram illustrating a hardware configuration of a personal computer 40 to which the information identification apparatus, information identification method, computer program, and recording medium according to the present illustrative embodiment are applied.

According to the present illustrative embodiment, information embedded in reference image data, which differs from image data subjected to identification, is used as reference information to identify supplemental information embedded in the image data.

In the following description of the present illustrative embodiment, redundant descriptions of substantially the same components or devices as those of the above-described illustrative embodiment are omitted for simplicity.

As illustrated in FIG. 7, the personal computer 40 includes a CPU 41, a RAM 42, a ROM 43, a communication interface 44, a user interface 45, and an external storage device 46, and the foregoing devices are electrically connected via a bus line 47. The bus line 47 may be, for example, an address or data bus.

The ROM 43 or the external storage device 46 stores software, such as an operating system (OS) and programs, or other data.

The CPU 41 executes such software stored on the ROM 43 or the external storage device 46, and control the devices connected to the bus line 47. The RAM 42 provides for example, a work area as a main memory of the CPU 41.

The external storage device 46 may be, for example, a hard disk drive, and stores a boot program, an operating system, a program for executing the information identification method, and other application programs.

The communication interface 44 is, for example, an Ethernet (registered trademark) interface, an IEEE1248 interface, or any other suitable interface. Under the control of the CPU 41, the communication interface 44 communicates an external device directly or indirectly connected to the personal computer 40.

The user interface 45 includes a plurality of input and output devices. For example, the input device may include a pointing device, such as a mouse or touch pen, a keyboard, or a touch panel. The output device may include a display, such as an LCD (liquid crystal display) or CRT (cathode ray tube), and a sound interface. Through such devices, the user interface 45 receives input operations with a plurality of operation keys from a user, and displays various types of information on the display. Thus, the user interface 45 outputs (provides) information to and inputs instructions (information) from a user.

The personal computer 40 is configured as an information identification apparatus capable of identifying supplemental information embedded in image data such as still image data or moving image data, or a printed document, by loading the information processing program onto the RAM 42. Specifically, such supplemental information may be embedded in one or more frame images of moving image data or one or more pages of a printed document. The information processing program causes the personal computer 40 or any other apparatus to operate as an information identification apparatus that performs an information identification method according to the present illustrative embodiment. The program may be recorded on a recording medium that the information identification apparatus can read. The recording medium may be, for example, a ROM, an EEPROM (electrically erasable and programmable read only memory), an EPROM (erasable and programmable read only memory), a flash memory, a flexible disk, a CD-ROM (compact disc read only memory), a CD-RW (compact disc rewritable), a DVD (digital video disc), an SD (secure digital) card, or an MO (magneto-optical) disc. The program may be a computer-executable program written in legacy or object-oriented programming language, such as assembler, C, C++, C#, or Java (registered trademark), which may be stored on one of the above-described recording media for distribution. Alternatively, the MFP 1 may read the information processing program from any device through a network.

Figure 8A:
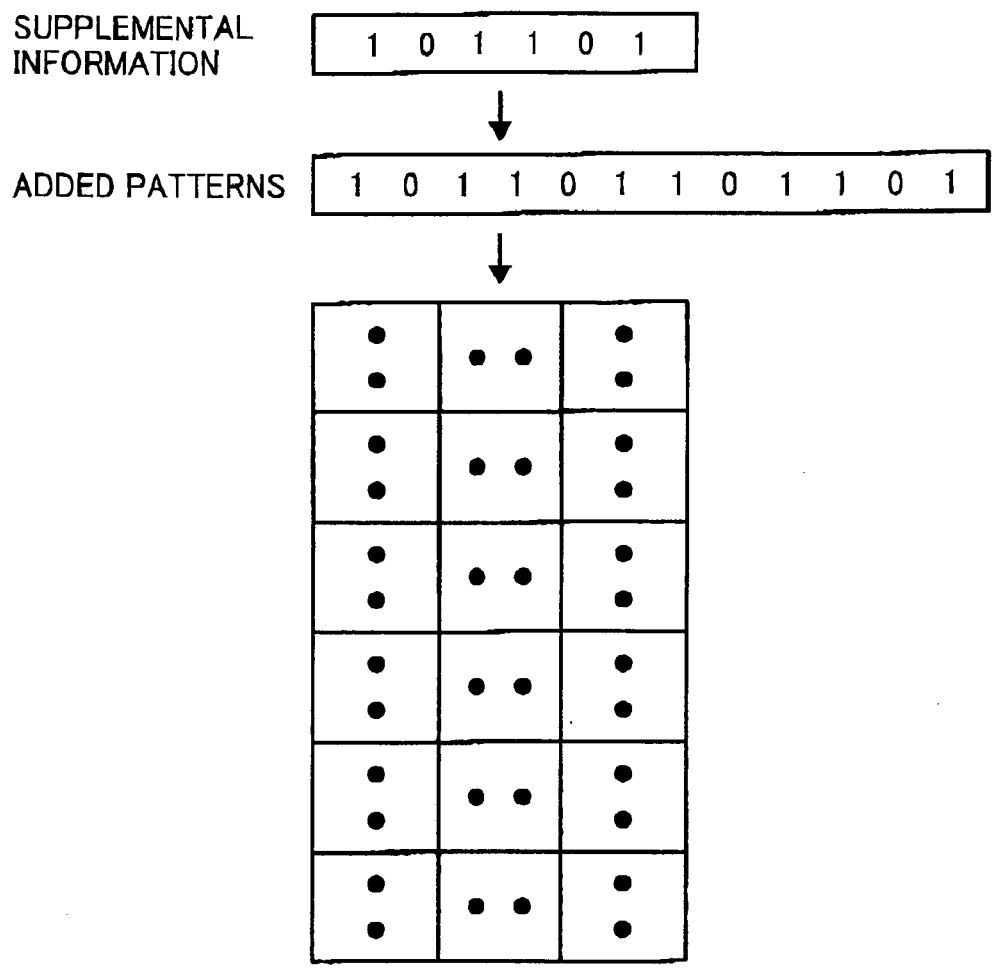
FIG. 8A is an illustration for explaining an example operation of adding supplemental information to image data.
Figure 8B:
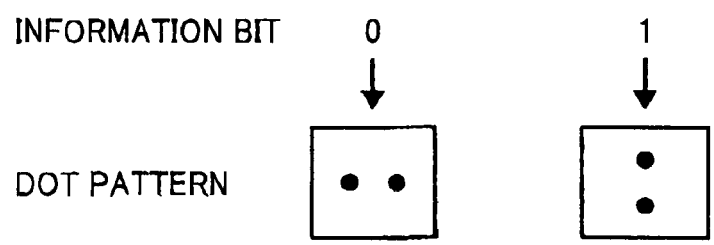
FIG. 8B is an illustration for explaining conversion from information bits to dot patterns.

By executing the information identification program stored on the above-described recording medium, the personal computer 40 identifies supplemental information using the image data in which the supplemental information is embedded as illustrated in FIGS. 8A and 8B. Such supplemental information embedded in image data may be, for example, copyright-management information or security information.

Such supplemental information embedded in image data is converted to a corresponding bit string (digital data), for example, "101101" as illustrated in FIG. 8A. Further, the bit string is transformed to pattern data corresponding the bit string (digital data) based on a corresponding relation as illustrated in FIG. 8B. Thus, the pattern data corresponding to the bit string is generated. Further, the generated pattern data is added to the image data, thereby causing the supplemental information to be embedded into the image data.

In this regard, the pattern data corresponding to the supplemental information may be repeatedly added multiple times to the image data. In such a case, even if a portion of the repeated pattern data added to the image data is lost due to noise or other factors, other portions of the repeated pattern data allow the supplemental information to be precisely acquired. For example, as illustrated in FIG. 8A, when the bit string (digital data) of "101101" corresponding to supplemental information is repeatedly embedded twice into image data, a pattern aggregation corresponding to the bit string of "101101101101" is added to the image data. In this regard, the pattern aggregation is an aggregation of a plurality of pattern sequences.

In FIG. 8A, the supplemental information is added to the image data using dot patterns. However, it is to be noted that the supplemental information may be added to image data using, for example, bar codes, frequency transformation of the image data, or deformation of the outline of an image component, such as a figure or character, contained in the image data.

Figure 9:
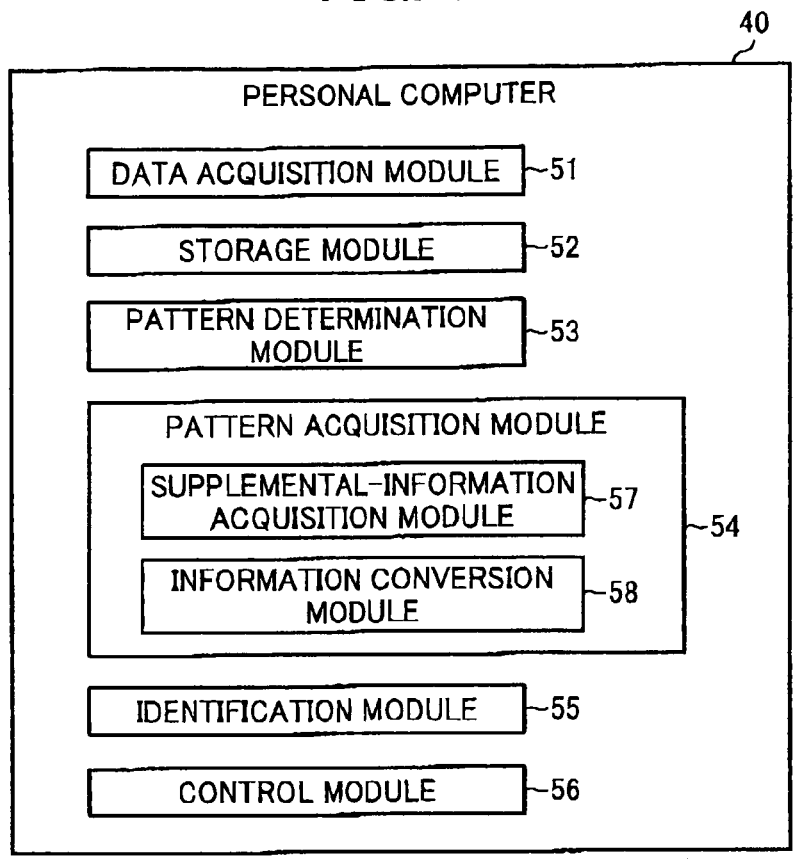
FIG. 9 is a block diagram illustrating a functional configuration of the personal computer illustrated in FIG. 7.
Figure 10:
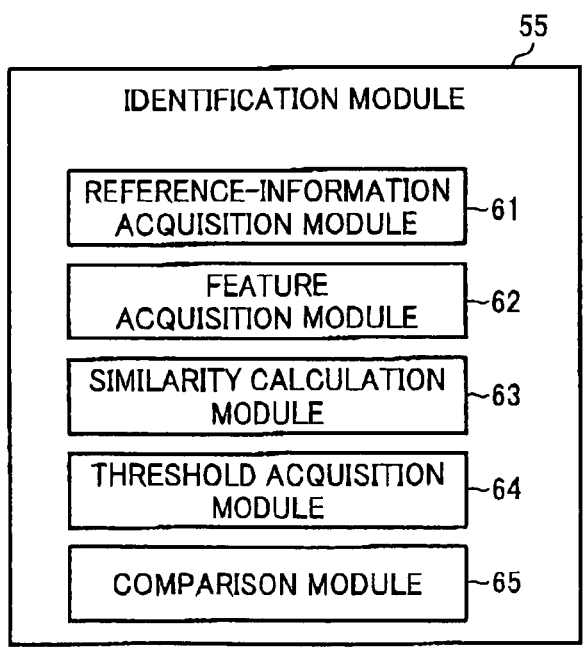
FIG. 10 is a block diagram illustrating a functional configuration of an identification module illustrated in FIG. 9.

The personal computer 40 loads the information processing program for executing the information identification method from a recording medium onto RAM 42, thereby constructing a plurality of modules as illustrated in FIG. 9. By executing the program, the personal computer 40 construct, for example, a data acquisition module 51, a storage 52, a pattern determination module 53, a pattern acquisition module 54, an identification module 55, and a control module 56. The pattern acquisition module 54 further includes an information acquisition module 57 and an information conversion module 58. As illustrated in FIG. 10, the identification module 55 may further include a reference-information acquisition module 61, a feature acquisition module 62, a similarity calculation module 63, a threshold acquisition module 64, and a comparison module 65.

The personal computer 40 uses, as reference information, the information embedded in the reference image data, which differs from the image data subjected to identification processing of the supplemental information (hereinafter, which may be referred to as "identification-target image data"), to determine target pattern data to be acquired from the identification-target image data based on the mode in which the supplemental information is embedded. The personal computer 40 also acquires the target pattern data from the identification-target image data based on the determination, compares the acquired pattern data to the reference information, and thus identifies the supplemental information embedded in the identification-target image data. For the above-described modules, the pattern determination module 53, the pattern acquisition module 54, and the identification module 55 perform processing on a plurality of pieces of image data, which differs from the processing of the pattern determination module 24, the pattern acquisition module 25, and the identification module 26 according to the above-described illustrative embodiment. Meanwhile, the data acquisition module 51, the storage 52, and the control module 56 perform basically the same processing as the data acquisition module 21, the storage 22, and the control module 27, respectively. For the present illustrative embodiment, a description is given below of the pattern determination module 53, the pattern acquisition module 54, and the identification module 55 for simplicity.

As is the case with the pattern determination module 24 according to the above-described illustrative embodiment, the pattern determination module 53 determines which pattern to be acquired from a plurality of patterns added to image data, or selects one or more of the plurality of patterns added in image data as target pattern data to be acquired from the image data. It is to be noted that the process of determining the target pattern data is different between the identification-target image data and the reference image data.

For the identification-target image data, as is the case with the above-described illustrative embodiment, the pattern determination module 53 determines which pattern to be acquired from the plurality of patterns added to the identification-target image data.

For the reference image data, in one pattern determination method, the pattern determination module 53 selects, as pattern data to be acquired from the reference image data, all patterns acquirable from the plurality of patterns added to the reference image data. In another pattern determination method, the pattern determination module 53 may selects, as such pattern data to be acquired from the reference image data, one or more patterns of the reference image data located at positions corresponding to the positions of patterns determined as the acquisition-target pattern data in the identification-target image data.

The first pattern determination method allows the pattern determination module 53 to omit processing for determining which pattern not to be acquired, thereby increasing the processing speed.

In the second pattern determination method, the number of bits of the pattern data acquired from the identification-target image data are the same as the number of bits of the pattern data acquired from the reference image data. The reliability of similarity calculation with the similarity calculation module 63 of the identification module 55 can be enhanced, thereby allowing the supplemental information to be more precisely identified.

Alternatively, in the first method, the pattern acquisition module 54, instead of the pattern determination module 53, may acquire patterns from the entire reference image data.

Next, a description is given of the pattern acquisition module 54.

The pattern acquisition module 54 according to the present illustrative embodiment basically executes processing similar to the pattern acquisition module 25 of the above-described illustrative embodiment. It is to be noted that the pattern acquisition module 54 executes processing on two pieces of image data, i.e., the identification-target image data and the reference image data, which differs from the processing of the pattern acquisition module 25.

Next, a description is given of the identification module 55.

As illustrated in FIG. 10, the identification module 55 includes the reference-information acquisition module 61, the feature acquisition module 62, the similarity calculation module 63, the threshold acquisition module 64, and the comparison module 65. The reference-information acquisition module 61, the similarity calculation module 63, the threshold acquisition module 64, and the comparison module 65 are similar to the reference-information acquisition module 31, the similarity calculation module 32, the threshold acquisition module 33, and the comparison module 34, respectively, and therefore redundant descriptions are omitted here. Below, a description is given of the reference-information acquisition module 61 and the feature acquisition module 62 of the identification module 55.

The reference-information acquisition module 61 acquires the reference information, which is used to identify the supplemental information added to the image data, not from the (identification-target) image data but from the information embedded in the reference image data, which is prepared in advance. The reference-information acquisition module 61 may acquire the reference information from an external device via the communication interface 3, or from a removable recording medium via the removable recording-medium reader 8. Further, the reference-information acquisition module 61 may acquire the reference information from the ROM 12 of the controller 2 or the HDD 9.

The feature acquisition module 62 recognizes an embedment mode in which the reference information is embedded based on the pattern data of the reference image data acquired by the reference-information acquisition module 61, and acquires the recognized mode as an embedment feature of the reference information.

For example, the feature acquisition module 62 acquires the number of patterns (bits) of repeat unit as another embedment feature of the reference information.

The feature acquisition module 62 outputs the embedment mode of the acquired reference information to the pattern determination module 53, and the pattern determination module 53 determines target pattern data to be acquired from the identification-target image data.

Next, a description is given of an information identification process according to the present illustrative embodiment.

The personal computer 40 according to the present illustrative embodiment determines the target pattern data to be acquired from the identification-target image data based on patterns embedded in the reference image data, which differs from the identification-target image data, to acquire the determined target pattern data from the identification-target image data. The personal computer 40 also determines the target pattern data based on the embedment mode in which the reference information is embedded in the reference image data. Thus, while shortening the pattern extraction processing, the supplemental information embedded in the identification-target image data can be identified as illustrated in FIG. 11 without reconstructing the supplemental information from the acquired target pattern data.

Figure 11:
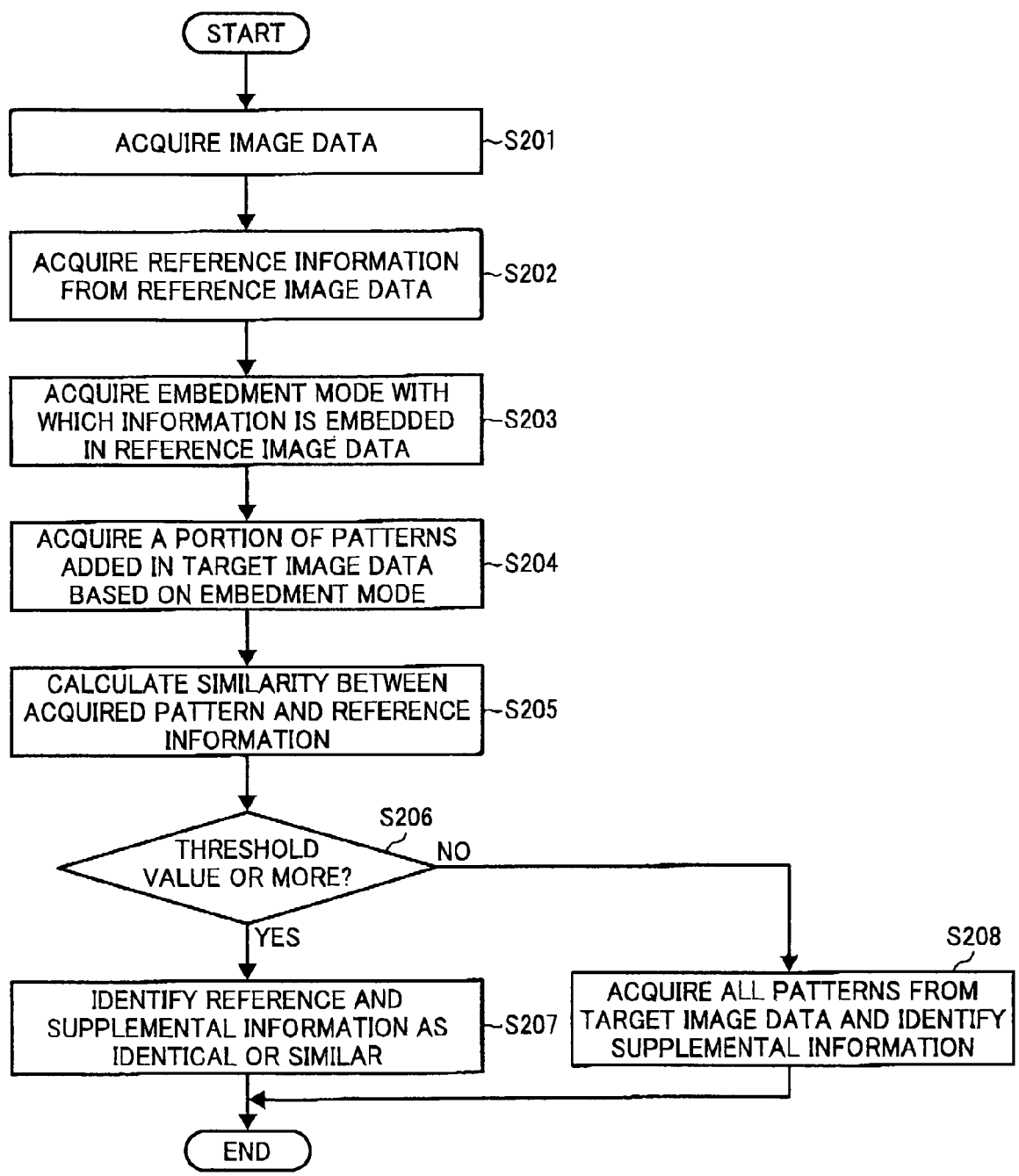
FIG. 11 is a flowchart illustrating an information identification process executed by the personal computer illustrated in FIG. 7.

Specifically, as illustrated in FIG. 11, at S201 the data acquisition module 51 acquires a plurality of pieces of image data in which information is embedded, and stores the plurality of pieces of image data into the storage 52 constructed by the RAM 42 or the external storage device 46. At S202, the reference-information acquisition module 61 of the identification module 55 reads one of the plurality of pieces of image data from the storage 52 as the reference image data, acquires pattern data (reference pattern data) added to the reference image data based on the determination by the pattern determination module 53, and acquires, as the reference information, the information embedded in the reference image data from the reference pattern data.

At S203, the feature acquisition module 62 acquires an embedment mode of the information embedded in the reference image data from the reference pattern data acquired at S202.

At S204, the pattern determination module 53 acquires, as target pattern data to be acquired from identification-target image data, one or more patterns from among a plurality of patterns added to the identification-target image data based on the acquired embedment mode.

At S205, the similarity calculation module 63 calculates a similarity value indicating the similarity between the reference information acquired at S202 and the target pattern data acquired at S204 from the identification-target image data. At S206, the comparison module 65 compares the calculated similarity value to a predetermined threshold acquired by the threshold acquisition module 64.

If at S206 the comparison module 65 determines that the calculated similarity value is greater than the threshold, the identification module 55 determines that the reference information and the target pattern data are identical, similar, or substantially the same information, and the control module 56 controls the subsequent process based on the determination result.

By contrast, if at S206 the comparison module 65 determines that the similarity value is not greater than the threshold, at S208 the identification module 55 determines that the reference information and the target pattern data are dissimilar or different from each other. When the comparison module 65 determines that the supplemental information embedded in the identification-target image data and the reference information are dissimilar or contain information that are different from each other, all of the patterns added to the target image data are extracted, and the supplemental information embedded in the target image data is identified based on all of the extracted patterns. The pattern extraction at S208 is executed in the same manner as the pattern extraction executed when the pattern determination module 24 determines all of the patterns added to the image data as the target pattern data.

As described above, the same pattern may be repeatedly added (interleaved) to the image data to enhance the reliability of extraction of the supplemental information. If the addition mode acquired by the feature acquisition module 62 is an interleaving repeat type, the pattern acquisition module 54 may acquire patterns corresponding to a single repeat unit to generate the supplemental information. As a result, the identification module 55 may finish the identification process of the supplemental information without executing the step S205 and the subsequent steps.

Thus, the personal computer 40 according to the present illustrative embodiment acquires information embedded in reference image data, which differs from identification-target image data, as reference information, and compares the reference information to pattern data acquired from identification-target image data to identify the supplemental information.

Such a process allows the personal computer 40 to easily acquire proper information as the reference information to identify the supplemental information.

Further, in the personal computer 40 according to the present illustrative embodiment, the pattern determination module 53 selects one or more from a plurality of patterns added to the identification-target image data as the target pattern data to be acquired from the identification-target image data.

Such configuration allows the supplemental information to be properly identified while further increasing the processing speed.

In the above-described illustrative embodiments, the information identification apparatus is applied to the MFP 1 and the personal computer 40. It is to be noted that the information identification apparatus of the MFP 1 and the information identification apparatus of the personal computer 40 are compatible with each other and operable in a system.

Further, the information identification apparatus according to the present invention is not limited to the MFP 1 and the personal computer 40 but may be an image forming apparatus, such as a copier, printer, or printing press, a mobile information terminal, such as a mobile phone, PDA (personal digital assistant), or mobile electronic game device, an image reading apparatus, such as a scanner, an image pickup apparatus, such as a digital camera or digital video camera, an audio-visual input-output apparatus, such as a television, HDD recorder, or audio set, an in-vehicle electronic apparatus, such as a car navigation, a digital home-electric appliance, a server machine, or any other apparatus capable of communicating information to a removable recording medium.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium.

For example, in one aspect, the invention resides in a computer-readable recording medium storing an information processing program to cause a computer to execute an method of identifying related information embedded in image data based on a plurality of patterns added in the image data. The method includes obtaining image data assumed to be embedded with supplemental information, extracting a portion of the image data to obtain target pattern data from the portion of the image data, obtaining reference information, comparing the target pattern data with the reference information to generate a comparison result, and determining whether the supplemental information embedded in the image data is identifiable using the reference information based on the comparison result.

Examples of such a storage medium include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. An information identification apparatus, comprising:
an image-data obtaining unit configured to obtain image data to which a plurality of pattern data converted from supplemental information has been added;
a reference-information obtaining unit configured to obtain reference information, wherein the reference information is used to identify the supplemental information corresponding to the plurality of pattern data and determine whether the reference information and the plurality of pattern data are identical;
a pattern obtaining unit configured to obtain a plurality of target pattern data that is not all of the plurality of pattern data;
a similarity calculation unit configured to calculate a similarity between the reference information and the target pattern data based on a degree of match between the reference information and each of the target pattern data;
a determining unit configured to determine whether the reference information and the plurality of pattern data added to the image-data are identical based on the similarity; and
an identification unit configured to identify the supplemental information corresponding to the plurality of pattern data added to the image-data based on a determination result obtained from the determining unit as to whether the reference information and the plurality of pattern data added to the image data are identical.

2. The information identification apparatus according to claim 1, further comprising:
a pattern determining unit configured to determine the target pattern data obtained by the pattern obtaining unit from one of a plurality of regions into which the image data is divided.

3. The information identification apparatus according to claim 2, further comprising a number determining unit configured to determine a number of pieces of the target pattern data to be obtained by the pattern obtaining unit in response to a number of pieces of the reference information.

4. The information identification apparatus according to claim 1, wherein when the determination result obtained from the determining unit indicates that the plurality of pattern data added to the image data is not identical to the reference information, the identification unit identifies the supplemental information corresponding to the plurality of pattern data added to the image data based on all of the plurality of pattern data added to the image data.

5. The information identification apparatus according to claim 1, wherein the pattern obtaining unit obtains a pattern data used as the reference information from a reference image data.

6. The information identification apparatus according to claim 5, wherein the determining unit determines all pattern data obtained from the reference image data as the pattern data obtained from the reference image data by the pattern obtaining unit.

7. The information identification apparatus according to claim 5, wherein the determining unit determines the pattern data obtained from the reference image data in accordance with a position of the target pattern data obtained from the image data.

8. The information identification apparatus according to claim 5, further comprising:
a feature obtaining unit configured to obtain a feature of embedment of the reference information from the pattern data obtained from the reference image data by the pattern obtaining unit, wherein the pattern obtaining unit determines the target pattern data obtained from the image data in accordance with the feature of the reference information obtained by the feature obtaining unit.

9. A non-transitory computer useable recording medium having computer readable program codes embodied in the medium that, when executed on a computer, configure the computer to function as an information identification apparatus, the information identification apparatus comprising:
an image-data obtaining unit configured to obtain image data to which a plurality of pattern data converted from supplemental information has been added;
a reference-information obtaining unit configured to obtain reference information, wherein the reference information is used to identify the supplemental information corresponding to the plurality of pattern data and determine whether the reference information and the plurality of pattern data are identical;
a pattern obtaining unit configured to obtain a plurality of target pattern data that is less than all of the plurality of pattern data;
a similarity calculation unit configured to calculate a similarity between the reference information and the target pattern data based on a degree of match between the reference information and each of the target pattern data;

a determining unit configured to determine whether the reference information and the plurality of pattern data added to the image data are identical based on the similarity; and an identification unit configured to identify the supplemental information corresponding to the plurality of pattern data added to the image data based on a determination result obtained from the determining unit as to whether the reference information and the plurality of pattern data added to the image data are identical.

10. The non-transitory computer useable recording medium of claim 9, when executed on the computer, further configuring the information identification apparatus to comprise:

a pattern determining unit configured to determine the target pattern data obtained by the pattern obtaining unit from one of a plurality of regions into which the image data is divided.

11. The non-transitory computer useable recording medium of claim 10, when executed on the computer, further configuring the information identification apparatus to comprise a number determining unit configured to determine number of pieces of the target pattern data to be obtained by the pattern obtaining unit in response to number of pieces of the reference information.

12. The non-transitory computer useable recording medium of claim 9, when executed on the computer, further configuring the information identification apparatus such that, when the determination result obtained from the determining unit indicates that plurality of pattern data added to the image data is not identical to the reference information, the identification unit identifies the supplemental information corresponding to the plurality of pattern data added to the image data based on all of the plurality of pattern data added to the image data.

13. The non-transitory computer useable recording medium of claim 9, when executed on the computer, further configuring the information identification apparatus such that the pattern obtaining unit obtains a pattern data used as the reference information from a reference image data.

14. The non-transitory computer useable recording medium of claim 13, when executed on the computer, further configuring the information identification apparatus such that the determining unit determines all pattern data obtained from the reference image data as the pattern data obtained from the reference image data by the pattern obtaining unit.

15. The non-transitory computer useable recording medium of claim 13, when executed on the computer, further configuring the information identification apparatus such that the determining unit determines the pattern data obtained from the reference image data in accordance with a position of the target pattern data obtained from the image data.

16. The non-transitory computer useable recording medium of claim of claim 13, when executed on the computer, further configuring the information identification apparatus to comprise:

a feature obtaining unit configured to obtain a feature of embedment of the reference information from the pattern data obtained from the reference image data by the pattern obtaining unit, wherein the pattern obtaining unit determines the target pattern data obtained from the image data in accordance with the feature of the reference information obtained by the feature obtaining unit.

17. A method of identifying supplemental information embedded in image data, the method comprising;

obtaining image data to which a plurality of pattern data converted from supplemental information has been added;

obtaining reference information wherein the reference information is used to identify the supplemental information corresponding to the plurality of pattern data and determine whether the reference information and the plurality of pattern data are identical;

obtaining a plurality of pattern data that is not all of the plurality of pattern data;

calculating a similarity between the reference information and the target pattern data based on a degree of match between the reference information and each of the target pattern data;

determining whether the reference information and the plurality of pattern data added to the image data are identical based on the similarity;

identifying the supplemental information corresponding to the plurality of pattern data added to the image-data based on a determination result obtained from the determining unit as to whether the reference information and the plurality of pattern data added to the image-data are identical.

* * * * *